United States Patent [19]

Shupert

[11] Patent Number: 4,502,270
[45] Date of Patent: Mar. 5, 1985

[54] CROP DIVIDER WITH ILLUMINATED POINTS

[75] Inventor: Paul T. Shupert, Milwaukee, Wis.

[73] Assignee: Allis-Chalmers Corporation, Milwaukee, Wis.

[21] Appl. No.: 576,342

[22] Filed: Feb. 2, 1984

[51] Int. Cl.³ .............................................. A01D 75/00
[52] U.S. Cl. .......................................... 56/314; 56/119
[58] Field of Search .................................. 56/314–320, 56/98, 1, 17.5, 16.9, 119, 327 R

[56] References Cited

U.S. PATENT DOCUMENTS 2,524,181  10/1950  Sivertson ........................ 56/327 R
2,547,328   4/1951  Koch et al. ........................ 56/17.5
4,160,355   7/1979  Blake et al. ........................... 56/98

Primary Examiner—Jay N. Eskovitz
Attorney, Agent, or Firm—Charles L. Schwab

[57] ABSTRACT

A mobile agricultural harvester has a crop header at its forward end including a plurality of crop dividers. The crop dividers each include a forwardly tapering point portion terminating at its forward end with a tip. Either the tip or the point portion or both are constructed of light emitting material, or are provided with windows covered by light emitting material, so as to provide improved illumination of the crop and field in front of the header during a harvesting operation.

7 Claims, 3 Drawing Figures

CROP DIVIDER WITH ILLUMINATED POINTS

TECHNICAL FIELD

This invention relates to an agricultural harvester or combine of the type having a crop header at its forward end which includes divider points.

BACKGROUND OF THE INVENTION

As farms become larger, harvesting equipment such as combines has also become bigger and wider as the farm operators strive to harvest their increased acreage within the annual harvesting period. In many instances, the farmer will harvest late into the evening hours at which time overhead lights are used to illuminate the portion of the field being harvested. In a corn harvesting operation, for instance, the tall wide-bladed stalks of corn cause shadows to be reflected forwardly into the field thereby reducing the effectiveness of the headlights mounted on the combine. In these conditions, the combine operator has considerable difficulty in observing the divider points that penetrate between the rows of the corn crop and has difficulty maintaining the proper alignment with the rows of corn being harvested. In these operating conditions, it is also difficult to judge the height of the crop divider points and it is difficult to see obstructions such as rocks in the field which might be picked up by the header and passed into the combine with possible resulting damage to the threshing mechanism.

SUMMARY OF THE INVENTION

This invention has particular utility in a wheeled agricultural harvester having a crop header at its forward end and an operator's station behind the header in an elevated relation to the latter. The header includes a plurality of forwardly extending crop dividers with point portions which are generally visible to an operator at the operator's station during a crop harvesting operation. The point portion has top and side walls of sheathing tapering forwardly to a tip. A substantial portion of the sheathing may be formed of a plastic material, such as translucent plastic, which permits passage of light therethrough. An illumination device, such as an electric light, is mounted on the point portion beneath the sheathing in position to direct light outwardly through a substantial part of the sheathing. A translucent plastic tip may be used on the front of the point portion and an illumination device, such as an electric light, may be positioned to illuminate the tip. The tip may be hollow and a light may be positioned within the hollow interior cavity of the tip. Alternatively, one or more side walls of the exterior sheathing of the point portions may include one or more windows which are covered by material which permits the passage of light therethrough.

It is an object of the present invention to provide an illuminated point portion on a crop divider which provides improved illumination of the area of the field being harvested and to make the point portions more visible to the operator during periods of reduced natural light or when harvesting in dense crop conditions.

It is a further object of the present invention to provide an illuminated point portion of a crop divider on a harvester which aids the operator in steering the harvester and in adjusting the height of the header in times of reduced natural lighting or in dense crop foliage conditions.

BRIEF DESCRIPTION OF THE DRAWINGS

Various embodiments of the present invention are illustrated in the drawings in which.

DETAILED DESCRIPTION OF THE INVENTION

Figure 1:
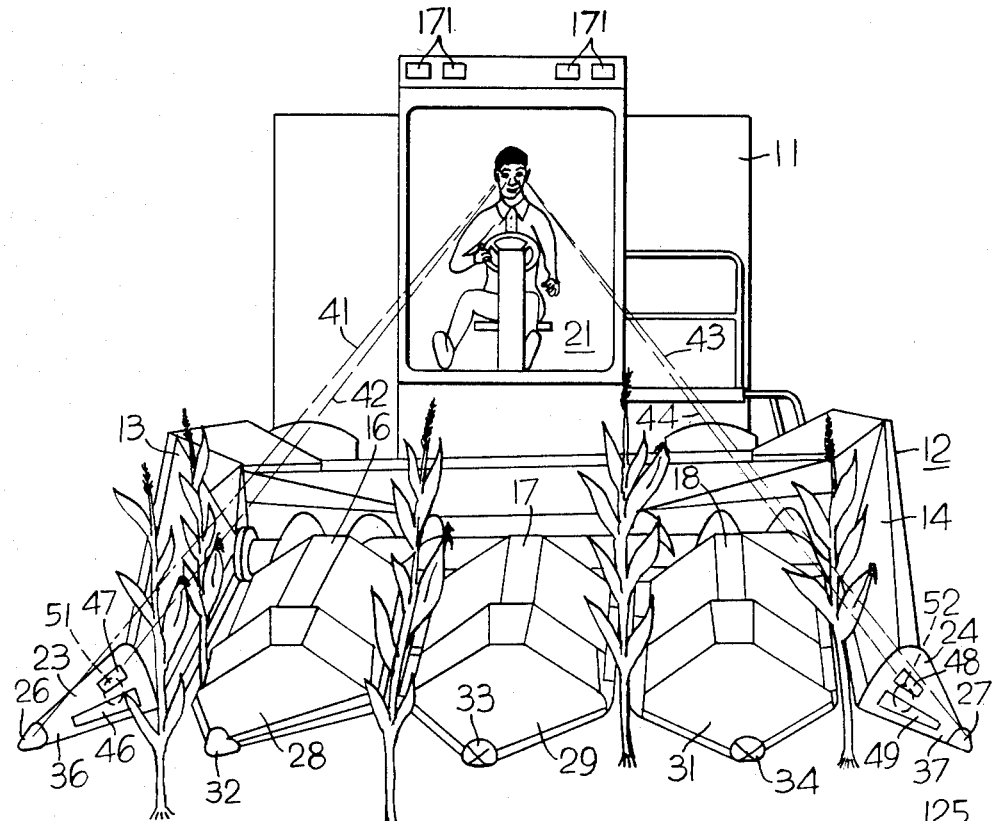
FIG. 1 is a front view of a harvester using a corn header.

Referring to FIG. 1, a mobile agricultural harvester in the form of a combine 11 includes a four row corn header 12 having crop dividers 13, 14 at its laterally opposite ends. The corn header 12 also includes intermediate row dividers 16, 17, 18. An operator's station 21 is mounted on the combine rearwardly of the corn header 12, and in an elevated position relative to the latter, thereby giving the operator a line of sight to the dividers of the corn head and good visibility of the crop being harvested. More specifically, the operator has lines of sight to the point portions 23, 24 of the laterally outer crop dividers 13, 14 as well as to the tips 26, 27 on the forward ends of the point portions 23, 24. The lines of sight are indicated by broken lines 41, 42, 43, 44. The crop dividers 16, 17, 18 also have point portions 28, 29, 31, respectively, which include tips 32, 33, 34 at their forward ends.

The point portions 23, 24 are covered by metal sheathing 36, 37 in which windows 46, 47, 48, 49 are formed and covered by a material which permits the passage of light such as a translucent plastic. Light emitting illumination devices in the form of electric lights 51, 52 are placed beneath the sheathing 36, 37 so as to transmit light through the windows 46, 47, 48, 49.

Figure 2:
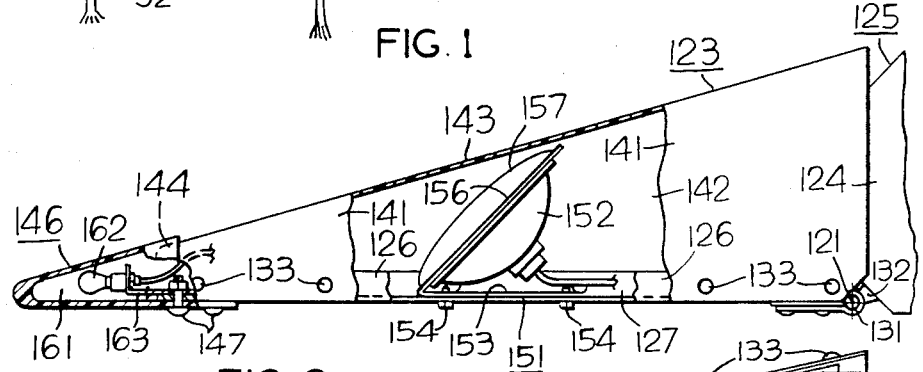
FIG. 2 is a side view of the point portion of a crop divider embodying certain features of the invention.
Figure 3:
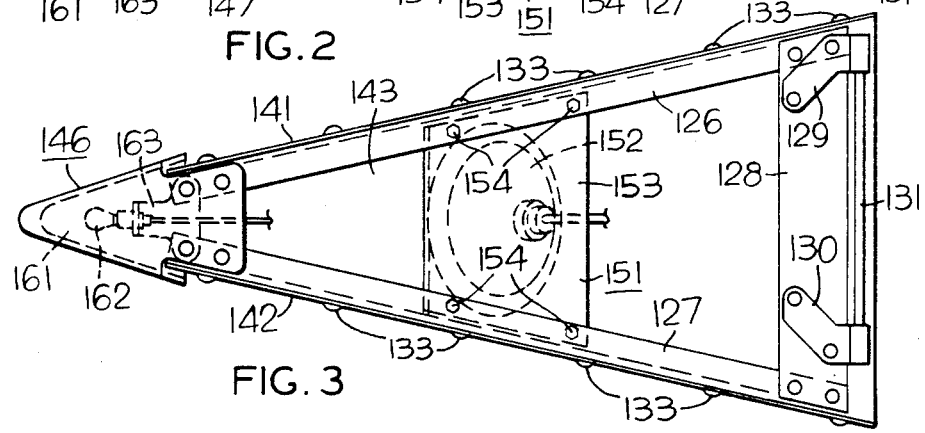
FIG. 3 is a bottom view of the point portion shown in FIG. 2.

Referring to FIGS. 2 and 3, a point portion 123 is pivotally connected to a rear portion 124 of a divider 125 for limited vertical swinging movement about a transverse axis 121. The point portion 123 includes a lower metal frame having a pair of forwardly converging angles 126, 127 which are interconnected at their rear ends by a transverse plate 128. The plate 128 carries a pair of hinge elements 129, 130 supporting a shaft 131 which in turn is connected to the rear portion 124 by a suitable hinge component 132. A sheathing of light emitting or translucent material of curved configuration has its laterally opposite lower edges secured to the upright flanges of the angles 126, 127 by fasteners 133. The sheathing thus has side walls 141, 142 and a top wall 143 formed of a single piece of uniform thickness material such as plastic. The walls 141, 142, 143 converge in a forward direction so as to taper to a reduced transverse cross section at its forward end 144. A plastic tip 146, which may be hollow as illustrated, is secured by fasteners 147 to horizontally disposed flanges of the angles 126, 127. A mounting bracket 151 for an electric light 152 has a horizontal portion 153 releasably secured to the angles 126, 127 by releasable fasteners in the form of capscrews 154. A slanting portion 156 of the mounting bracket 151 has an annular opening for receiving the light 152 so that its convex lens 157 transmits light forwardly, upwardly and laterally through the plastic sheathing.

The hollow plastic tip 146 is made of translucent plastic or other light emitting material and presents an interior cavity 161 for receiving a light emitting device in the form of an electric light 162 supported on a bracket 163 mounted on the angles 126, 127. The light 162 in the tip 146 makes the latter more readily visible to the operator in dense foliage or at night thereby aiding the operator in steering the combine and in adjusting the height of the header in relation to the ground.

When a combine is engaged in a harvesting operation at night, the overhead headlights, such as headlights 171 shown in FIG. 1, are normally used for illumination of the field ahead of the combine. When harvesting a crop with dense foliage such as corn, the overhead lights shining against the standing crop at the front of the header cause shadows to be thrown forward creating dark areas in front of the header. By using illuminated point portions and illuminated tips, the light will be dispersed in the foliage thereby increasing visibility. The improved visibility of the tip and point portion and the adjacent field area permits the operator to more accurately steer the combine. A lighted tip and/or point portion will also help the operator to select the proper height to prevent running the tips into the ground. It is believed possible to illuminate the point portions in a manner to provide sufficient lighting of the field area in front of the header to permit the operator to see rocks in the field in time to raise the header or stop the combine operation before the rocks reach the vulnerable crop handling parts of the combine.

The embodiments of the invention in which an exclusive property or privilege is claimed are defined as follows:

1. In a wheeled agricultural harvester having a crop header at its forward end for crop engaging movement in close proximity to the ground and an operator's station behind said header in elevated relation to the latter, the combination comprising,
   a crop divider on and extending forwardly from said header including
      a point portion at the forward end of said divider having top and side walls of sheathing tapering forwardly to a tip, a portion of said sheathing being a translucent material which permits passage of light therethrough and is visible to an operator at the operator's station, said point portion being at a level below a major portion of the foliage of the crop being harvested when said harvester is engaged in a harvesting operation, and
      an illumination device mounted on said point portion beneath said sheathing and positioned to direct light outwardly through said translucent material, whereby said foliage and adjacent ground area is illuminated thereby aiding said operator in steering said harvester, in maintaining the proper operating height of said header and in seeing foreign objects prior to engagement thereof by said header.

2. The harvester of claim 1 and further comprising a translucent plastic tip on the front of said point portion and means illuminating said tip.

3. The harvester of claim 2 wherein said tip is hollow and said means illuminating said tip is within said tip.

4. In a wheeled agricultural harvester having a crop header at its forward end and an operator's station behind said header in elevated relation to the latter, the combination comprising,
   a crop divider on and extending forwardly from said header including
      a point portion at the forward end of said divider having exterior sheathing forming top and laterally opposite side walls tapering forwardly to a tip, a substantial part of at least one of said side walls being made of a material which permits the passage of light therethrough and is visible to an operator at the operator's station, said point portion being at a level below a major portion of the foliage of the crop being harvested when said harvester is engaged in a harvesting operation, and
      a light emitting device mounted on said point portion beneath said sheathing and positioned to direct light through said part, whereby said foliage and adjacent ground area is illuminated thereby aiding said operator in steering said harvester, in mantaining the proper height of said header and in seeing foreign objects in the field prior to their being encountered by said header.

5. The harvester of claim 4 wherein said part includes a window covered by said material.

6. In a wheeled agricultural harvester having a crop header at its forward end and an operator's station behind said header in elevated relation to the latter, the combination comprising,
   a crop divider on and extending forwardly from said header including
      a fore and aft extending point portion at the forward end of said divider and the exterior of said point being formed of sheathing forming top and side walls tapering forwardly to a tip of translucent material, said tip being visable to an operator at the operator's station and being at a level below a major portion of the foliage of the crop being harvested when said harvester is engaged in a harvesting operation, and
      means lighting said tip to cause the latter to emit light whereby said foliage and adjacent ground area is illuminated thereby aiding said operator in steering said harvester, in maintaining the proper operating height of said header and in seeing foreign objects prior to engagement thereof by said header.

7. The harvester of claim 6 wherein at least a part of said sheathing is comprised of material permitting light to pass therethrough and further including a light producing device within said point portion causing light to be emitted through said part.

* * * * *